United States Patent
Phillips

(10) Patent No.: US 11,245,959 B2
(45) Date of Patent: Feb. 8, 2022

(54) CONTINUOUS DUAL AUTHENTICATION TO ACCESS MEDIA CONTENT

(71) Applicant: Source Digital, Inc., Barto, PA (US)

(72) Inventor: Michael Eric Phillips, Melrose, MA (US)

(73) Assignee: Source Digital, Inc., Barto, PA (US)

( * ) Notice: Subject to any disclaimer, the term of this patent is extended or adjusted under 35 U.S.C. 154(b) by 0 days.

(21) Appl. No.: 16/447,883

(22) Filed: Jun. 20, 2019

(65) Prior Publication Data
US 2020/0404365 A1    Dec. 24, 2020

(51) Int. Cl.
| | |
|---|---|
| H04N 21/44 | (2011.01) |
| H04N 21/4415 | (2011.01) |
| G06F 21/32 | (2013.01) |
| H04L 9/32 | (2006.01) |
| H04N 21/435 | (2011.01) |
| H04N 21/442 | (2011.01) |

(52) U.S. Cl.
CPC ......... *H04N 21/4415* (2013.01); *G06F 21/32* (2013.01); *H04L 9/3226* (2013.01); *H04N 21/435* (2013.01); *H04N 21/44204* (2013.01); *H04N 21/44222* (2013.01)

(58) Field of Classification Search
CPC ......... H04N 21/2401; H04N 21/25816; H04N 21/25875; H04N 21/44008; H04N 21/441; G06F 21/32; G06F 21/10; G06F 21/30
See application file for complete search history.

(56) References Cited

U.S. PATENT DOCUMENTS

| | | |
|---|---|---|
| 5,874,955 A | 2/1999 | Rogowitz et al. |
| 6,573,942 B1 | 6/2003 | Crinon |
| 6,766,524 B1 * | 7/2004 | Matheny ............ G06Q 30/0226 348/E7.07 |
| 7,075,584 B2 | 7/2006 | Crinon |
| 7,188,353 B1 | 3/2007 | Crinon |
| 7,333,153 B2 | 2/2008 | Hartson |
| 7,394,967 B1 * | 7/2008 | Potrebic ................. H04N 21/47 386/248 |
| 8,051,453 B2 | 11/2011 | Arseneau |
| 8,266,659 B2 * | 9/2012 | Urdang ............ H04N 21/44222 725/88 |
| 9,015,747 B2 | 4/2015 | Russell |
| 9,065,984 B2 | 6/2015 | Arseneau |
| 9,071,885 B2 | 6/2015 | Landers |
| 9,275,427 B1 | 3/2016 | Sharifi |
| 9,374,374 B2 | 6/2016 | Steinberg et al. |
| 9,548,894 B2 * | 1/2017 | Glenn ................. G06Q 10/101 |
| 9,626,493 B2 * | 4/2017 | Cohen ..................... G06F 21/16 |

(Continued)

FOREIGN PATENT DOCUMENTS

WO        03000091990 A1    11/2003

*Primary Examiner* — Jefferey F Harold
*Assistant Examiner* — Timothy R Newlin
(74) *Attorney, Agent, or Firm* — Renner, Otto, Boisselle & Sklar, LLP

(57) ABSTRACT

A machine or group of machines for dual authentication include a processor configured to receive a user credential and a content fingerprint. The processor is configured to identify content associated with the content fingerprint, verify the user credential is authorized to access the content associated with the content fingerprint, and transmit an authorization to stream content associated with the user credential and the content fingerprint.

14 Claims, 8 Drawing Sheets

(56) References Cited

U.S. PATENT DOCUMENTS

| | | | |
|---|---|---|---|
| 10,104,437 B2* | 10/2018 | Lorrain | H04N 21/4367 |
| 2002/0056136 A1 | 5/2002 | Wistendahl et al. | |
| 2003/0020744 A1* | 1/2003 | Ellis | H04N 5/44543 |
| | | | 715/723 |
| 2003/0106069 A1 | 6/2003 | Crinon | |
| 2004/0005093 A1* | 1/2004 | Rhoads | H04N 1/32208 |
| | | | 382/232 |
| 2006/0190776 A1* | 8/2006 | Oostveen | H04N 21/6587 |
| | | | 714/700 |
| 2007/0022438 A1 | 1/2007 | Arseneau | |
| 2008/0019576 A1 | 1/2008 | Senftner et al. | |
| 2010/0086277 A1* | 4/2010 | Craner | H04N 5/76 |
| | | | 386/278 |
| 2010/0125870 A1* | 5/2010 | Ukawa | H04N 21/47202 |
| | | | 725/32 |
| 2010/0280876 A1* | 11/2010 | Bowra | H04N 21/262 |
| | | | 705/14.41 |
| 2011/0016172 A1 | 1/2011 | Shah | |
| 2011/0063503 A1 | 3/2011 | Brand et al. | |
| 2011/0321114 A1 | 12/2011 | Newell | |
| 2012/0077462 A1* | 3/2012 | Rozensztejn | H04L 29/1232 |
| | | | 455/411 |
| 2012/0117584 A1* | 5/2012 | Gordon | H04N 21/23892 |
| | | | 725/19 |
| 2012/0124604 A1* | 5/2012 | Small | H04N 21/4223 |
| | | | 725/12 |
| 2012/0143772 A1* | 6/2012 | Abadir | G06Q 20/401 |
| | | | 705/75 |
| 2012/0215329 A1 | 8/2012 | Jiang et al. | |
| 2013/0151970 A1 | 6/2013 | Achour | |
| 2013/0160038 A1* | 6/2013 | Slaney | H04N 21/8352 |
| | | | 725/14 |
| 2013/0178966 A1 | 7/2013 | Magnusso | |
| 2013/0188095 A1 | 7/2013 | Hartson | |
| 2013/0205321 A1* | 8/2013 | Sinha | H04N 21/4147 |
| | | | 725/19 |
| 2013/0259211 A1 | 10/2013 | Vlack | |
| 2014/0196077 A1* | 7/2014 | Gordon | H04N 21/23418 |
| | | | 725/31 |
| 2014/0278904 A1* | 9/2014 | Seiden | G06Q 30/0217 |
| | | | 705/14.36 |
| 2014/0281004 A1* | 9/2014 | Bridges | H04N 21/4622 |
| | | | 709/231 |
| 2014/0282662 A1 | 9/2014 | Major | |
| 2014/0310006 A1 | 10/2014 | Anguera Miro | |
| 2014/0359079 A1 | 12/2014 | Weill | |
| 2015/0045920 A1 | 2/2015 | Liu | |
| 2015/0058175 A1* | 2/2015 | Axt | G06Q 20/123 |
| | | | 705/26.81 |
| 2015/0088760 A1* | 3/2015 | Meurs | G06Q 20/425 |
| | | | 705/72 |
| 2015/0110457 A1 | 4/2015 | Abecassis et al. | |
| 2015/0156270 A1* | 6/2015 | Teraoka | G06F 21/62 |
| | | | 709/219 |
| 2015/0189347 A1 | 7/2015 | Oztaskent et al. | |
| 2015/0230004 A1* | 8/2015 | VanDuyn | H04N 21/42204 |
| | | | 725/27 |
| 2015/0287416 A1 | 10/2015 | Brands | |
| 2015/0294368 A1 | 10/2015 | Russell | |
| 2015/0319506 A1 | 11/2015 | Kansara et al. | |
| 2015/0373455 A1 | 12/2015 | Donaldson | |
| 2016/0014461 A1* | 1/2016 | Leech | H04N 21/4312 |
| | | | 725/14 |
| 2016/0021421 A1 | 1/2016 | Panger | |
| 2016/0112771 A1* | 4/2016 | Choi | H04N 21/25883 |
| | | | 725/14 |
| 2016/0127759 A1* | 5/2016 | Jung | H04N 21/4394 |
| | | | 725/19 |
| 2016/0182855 A1 | 6/2016 | Caligor et al. | |
| 2016/0249115 A1 | 8/2016 | Lincke | |
| 2016/0316261 A1* | 10/2016 | Koshevoy | H04N 21/812 |
| 2017/0084084 A1* | 3/2017 | Durham | G06F 3/04842 |
| 2017/0144074 A1 | 5/2017 | Brunstetter | |
| 2017/0164052 A1* | 6/2017 | Price | H04N 21/44008 |
| 2017/0238068 A1* | 8/2017 | Sellers | H04N 21/8455 |
| | | | 725/32 |
| 2017/0244999 A1* | 8/2017 | Chen | G06F 16/48 |
| 2018/0048644 A1* | 2/2018 | Schrempp | H04L 65/4076 |
| 2019/0037257 A1* | 1/2019 | Nelson | H04N 21/4394 |
| 2019/0149887 A1* | 5/2019 | Williams | G06F 3/04817 |
| | | | 725/52 |
| 2019/0191220 A1* | 6/2019 | Patel | H04N 21/8405 |

\* cited by examiner

CONTINUOUS DUAL AUTHENTICATION TO ACCESS MEDIA CONTENT

BACKGROUND

Protecting media content from unauthorized distribution and viewing has application across many industries such as music, gaming, and motion pictures. For example, when a studio produces a new film, DVDs and/or digital copies of the film may be sent to, or streamed by, film critics, Academy of Motion Picture Arts and Sciences members, market test screeners, film school professors, etc. These advanced copies of the film are called "screening copies" because the target audience screens the film prior to the release of the film to the public. These screening copies are not allowed to be sold or copied by the recipients because of copyright infringement but circumvention of existing protections is common. Current technologies allow recipients of screening copies to share the film with unauthorized persons. A DVD may simply be shared with a friend or, more seriously, ripped to a digital copy and shared over the Internet. If videos are streamed, login credentials may be shared with, or stolen by, unauthorized individuals. Individual watermarking of screening copies is possible but is costly and largely ineffective.

Accordingly, there is a need in the art for improved systems and methods of continuous end-user dual authentication to access media content to reduce the risk associated with the distribution of screening copies to an intended or a specific targeted audience or individual which may or may not have specific rules of engagement defined.

SUMMARY OF THE INVENTION

The present disclosure provides methods and systems to address these problems. The present disclosure describes a dual authentication process when accessing media content such as movies, television, audio stream, video games, and the like. The dual authentication process combines available security methods with Automatic Content Recognition (ACR) technologies to ensure only authorized consumers are accessing content. Specifically, once an authorized user begins to view media content, content fingerprinting is performed by a mobile device of the authorized user and a content fingerprint is compared to a reference representation of the media content managed by the content owner. After content identification, if the content fingerprint is synced with the reference representation, the media content will continue streaming. If the content fingerprint is not synced with the reference representation, i.e., the mobile device loses sync, a server and/or video player streaming the media content is given a command to stop streaming the media content. The present disclosure provides continuous dual authentication by verifying an authorized user is accessing the media content and verifying an authorized device is generating valid content fingerprints for the duration of presentation of the media content as defined by the content owner. In addition to the validation process, other rules and terms of viewer engagement can also be defined as a result of the sync reference.

The accompanying drawings, which are incorporated in and constitute a part of the specification, illustrate various example systems, methods, and so on, that illustrate various example embodiments of aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

DETAILED DESCRIPTION

Figure 1:
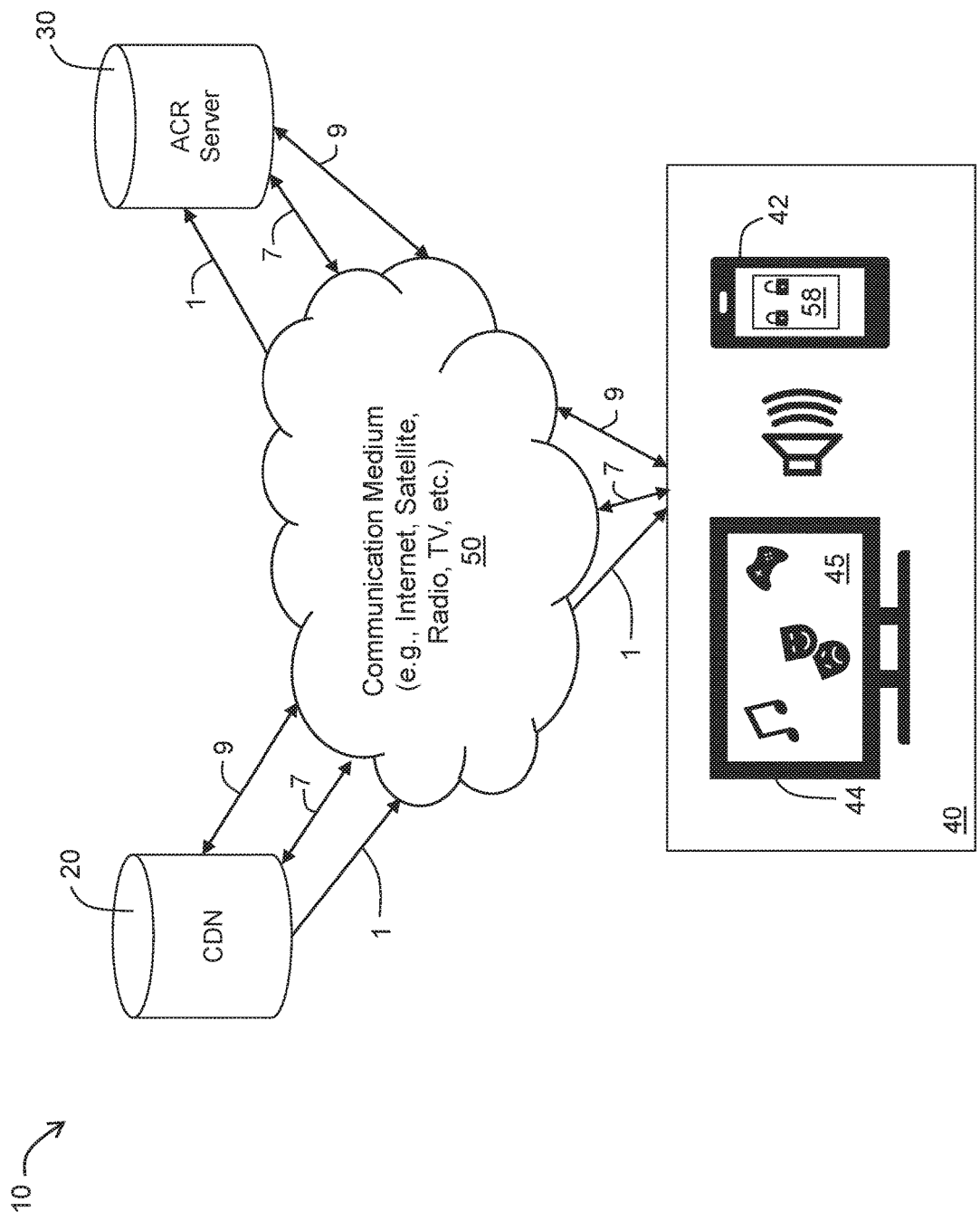
FIG. 1 illustrates a block diagram of an exemplary system for continuous dual authentication using user credentials and content fingerprinting.

FIG. 1 illustrates a schematic diagram of an exemplary system 10 for continuous dual authentication to access media content. The system 10 includes three major elements: a content delivery network (CDN) 20, an Automatic Content Recognition (ACR) server 30, and a consumer 40. FIG. 1 also shows a medium 50 through which the CDN 20, the ACR server 30, and the consumer 40 may communicate with each other. The consumer 40 element may consist of one or more devices such as a mobile device 42 and a primary device 44 coupled to the medium 50. Although illustrated separately, the ACR server 30 may be implemented in the CDN 20. The mobile device is listening to the content being played in order to check sync at point of viewing.

FIG. 1 shows content 1, which may be a movie, a TV show, a sports event, Internet video, radio, a video game, virtual reality (VR), augmented reality (AR), mixed reality (MR) environment, or audio only programs via radio, podcast, etc. FIG. 1 also shows authentication and authorization data 7, which is data that is related to the identity of the consumer 40 and the permission of a consumer 40 to access content 1. The authentication and authorization data 7 may include user credentials such as a user identification and password, a token from a biometric token generator such as a fingerprint reader, a camera, a structured light sensor, a device identifier associated with the consumer 40, etc. The device identifier may include mobile device identifier such as a hardware or software address associated with the mobile device, an identifier for advertising (IDFA), a publisher specific identifier, etc. One or more elements in the system 10 may use the user credentials and the device identifier to validate the consumer 40 is authorized to access the content 1 and issue an access token that is included in the authentication and authorization data 7.

Although for ease of explanation the present disclosure refers to the element 20 as a CDN 20, the element is not limited to CDNs or CDN facilities or equipment. In practice, CDN 20 may represent any facility or equipment such as production, editing, quality control, or mastering equipment that processes the content 1 prior to and during playout for streaming, transmission, or broadcasting.

Similarly, although for ease of explanation the present disclosure refers to the element 40 as the consumer 40, the element 40 is not limited to consumers or consumer premises or equipment. In practice, the consumer 40 may represent any premise or equipment end user that must be continuously authenticated and authorized to receive the content 1 during playout for streaming, transmission, or broadcasting.

Also, the medium 50 may be any medium used to transmit content 1 or data generally such as, for example, the Internet, satellite communication, radio communication, television communication (broadcast or cable), etc. Although in the figures the medium 50 is shown as being shared by the CDN 20, the ACR server 30, and the consumer 40, communication between these elements does not need to take place in the same medium. So, for example, the CDN 20 may communicate with the consumer 40 via satellite while the CDN 20 and the consumer 40 communicate with the ACR Server 30 via the Internet.

In the example of FIG. 1, the consumer 40 may enter authentication and authorization data 7 such as user credentials into an application 58 on the mobile device 42 to access content 1 using primary device 44. The application 58 may cause the mobile device 42 to transmit the authentication and authorization data 7, including a user credential and a mobile device identifier associated with the consumer, to the CDN 20 for verification the consumer 40 is authorized to access the content 1. In another embodiment, the consumer 40 may enter the authentication data 7 into the primary device 44 for the device 44 to transmit the authentication and authorization data 7 to the CDN 20 for verification the consumer 40 is authorized to access the content 1. The consumer 40 may receive the content 1 from the CDN 20 on video application 45 on the primary device 44 and/or the mobile device 42. To prevent unauthorized access to content 1, the mobile device 42 may be used to provide continuous dual authentication. The application 58 on the mobile device may be configured to transmit ACR data 9 to the ACR server 30. The ACR data 9 may include audiovisual data used to identify a content fingerprint by the ACR server 30. The application 58 on the mobile device 42 may be configured to identify the content fingerprint and transmit the content fingerprint in the ACR data 9 to the ACR server 30. The ACR data 9 may be transmitted to the ACR server 30 at predetermined intervals such as every 30 seconds, every 5 minutes, etc. One of ordinary skill in the art would recognize many variations, modifications, and alternatives.

The ACR server 30 may process content 1 and store a reference representation. The ACR server 30 may use the ACR data 9 to identify a content fingerprint and determine the content fingerprint is synced with a predetermined fingerprint in the reference representation. The synced content fingerprint may be used to identify additional ACR data 9 data describing the content 1 such as content name, content identification data, a position in the content 1, and the like. The ACR server 30 may use content identification data and the associated content fingerprint to determine the audio/visual data is being received by the mobile device 42 of an authorized consumer 40. The ACR server 30 may transmit an authorization (e.g., an access token) to continue streaming content 1 associated with the authorized consumer 40 to one or more of the CDN 20 and the consumer 40. If the authorization is received by the consumer 40, one or more consumer devices such as the mobile device 42 and/or the video player may transmit the authorization to the CDN 20.

In another embodiment, the ACR server 30 may transmit the ACR data 9, including a reference representation, to one or more of the CDN 20 and the consumer 40. If the CDN 20 receives the ACR data 9, the CDN 20 may determine ACR data 9 such as the content fingerprint, the content name, and/or content identification data are associated with the user credential of consumer 40 and continue to transmit content 1 to the consumer 40 if the consumer 40 is authorized to receive content 1. If the consumer 40 receives the ACR data 9, the mobile device 42 of consumer 40 may sync a content fingerprint with the reference representation in the ACR data 9 to verify the content name, and/or content identification data are associated with the user credential of the consumer 40 and transmit an authorization (e.g., an access token) to the CDN 20 to continue streaming content 1 associated with the user credential and the content fingerprint.

As discussed above, unauthorized distribution of content 1 is possible if a consumer 40 shares their user credentials with an unauthorized individual. Continuous dual authentication using content fingerprints based on audio/visual data received by mobile device 42 ties the viewing of content 1 to a single consumer device, i.e., mobile device 42. The continuous dual authentication system allows a content provider to define an audience of consumers 40 with rights to watch but not share. For example, to contravene the continuous dual authentication system described herein, an unauthorized user would need to have the mobile device of an authorized user for an extended time so that content fingerprints can be synced to the reference representation for the duration of viewing content 1. This is a tighter form of security that a typical code sent to a device for dual authentication as those can be shared as well.

Figure 2:
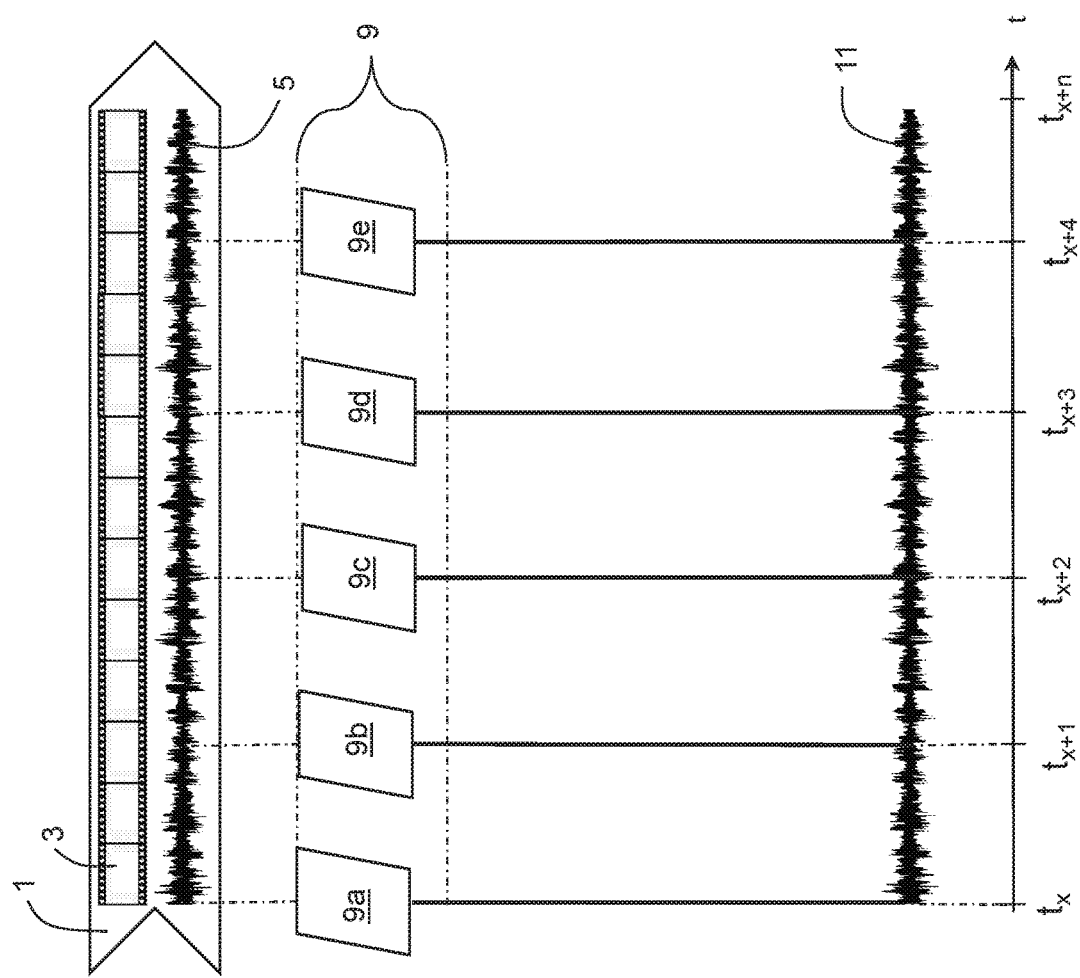
FIG. 2 illustrates a schematic diagram of an exemplary method for synchronizing content including audio to automatic content recognition data.

FIG. 2 illustrates a schematic diagram of exemplary ACR data such as audio/visual data, content fingerprints, content identification data, a position in the content, etc. Continuous dual authentication may be used for a variety of content such as a movie, a TV show, a sports event (e.g., basketball game), Internet video, a video game, a virtual reality (VR), augmented reality (AR), or mixed reality (MR) environment, or audio only programs via radio, Internet, etc. The simplest exemplary content 1 is a movie with video 3 and audio 5.

FIG. 2 shows content 1 and associated ACR data 9. The ACR data $9a$ is aligned to a time $t_x$ of the content 1. ACR data $9b$ appears at or relates to a time $t_{x+1}$ of the content 1. ACR data $9c$ appears at or relates to time $t_{x+2}$. ACR data $9d$ appears at or relates to time $t_{x+3}$ of the content 1 and ACR data $9e$ appears at or relates to time $t_{x+4}$.

An ACR model is discussed in more detail below in reference to FIG. 2. The ACR model involves using a fingerprint to identify the position in relation to time of the associated ACR data 9. The ACR model may include an acoustic fingerprint generation technology which utilizes the raw audio stream from a recorded piece of media such as a television broadcast or movie and creates a unique set of data—a "fingerprint"—which can be later used to for time-based content identification. Each ACR fingerprint which is generated identifies a piece of media and the time within that media. As explained below, the ACR model has both a server (content) side and client (consumer) side component. The server side component is responsible for generating acoustic fingerprints for a given media and the client "listening" side is responsible for capturing incoming audio from the client device's microphone, converting this to a fingerprint using the same ACR model and comparing this against a set of fingerprints based on a reference representation 11 of content 1 to determine media time position. The ACR technology can be used in pre-recorded and real-time scenarios.

In the pre-recorded scenario, the ACR server 30 generates a set of content fingerprints ahead of time and stores them in a database along with additional data such as content name, content identification data, a position in the content, and the like. The client app (e.g., an application on a mobile device of a consumer) will load these fingerprints at a later time from the database along with relevant additional data. The client app may then listen to the microphone on the client device and begin generating ACR data 9 such as fingerprints for the incoming audio stream. As fingerprints are generated, they are compared against the pre-generated fingerprints for the reference representation 11 and upon successfully matching a fingerprint, the known time of the media is used to generate additional ACR data 9 such as the position in the content. The position in the content may be used by the client app for additional consumer analytics such as determining the percentage of content 1 viewed by a consumer.

In a real-time scenario, a content source such as the CDN server provides 1+ audio streams to the ACR server (for example a different language track). Each stream is independently identified and fingerprinted over time and the generated fingerprints are published to the database along with the content name, content identification data, position in the content, and the like. The client app or consumer is provided these fingerprints in real-time and uses the same algorithm to match the incoming audio on the microphone to the fingerprints being sent real-time from the CDN server or ACR server. Upon identification, the client app can provide the appropriate access to the consumer.

In either scenario, upon successfully matching a fingerprint on the device to one of the server generated fingerprints, the app has determined both the media being watched and the time offset within that media. In addition to continuous dual authentication, this information can then be published to a web service for data analytics gathering.

Figure 3:
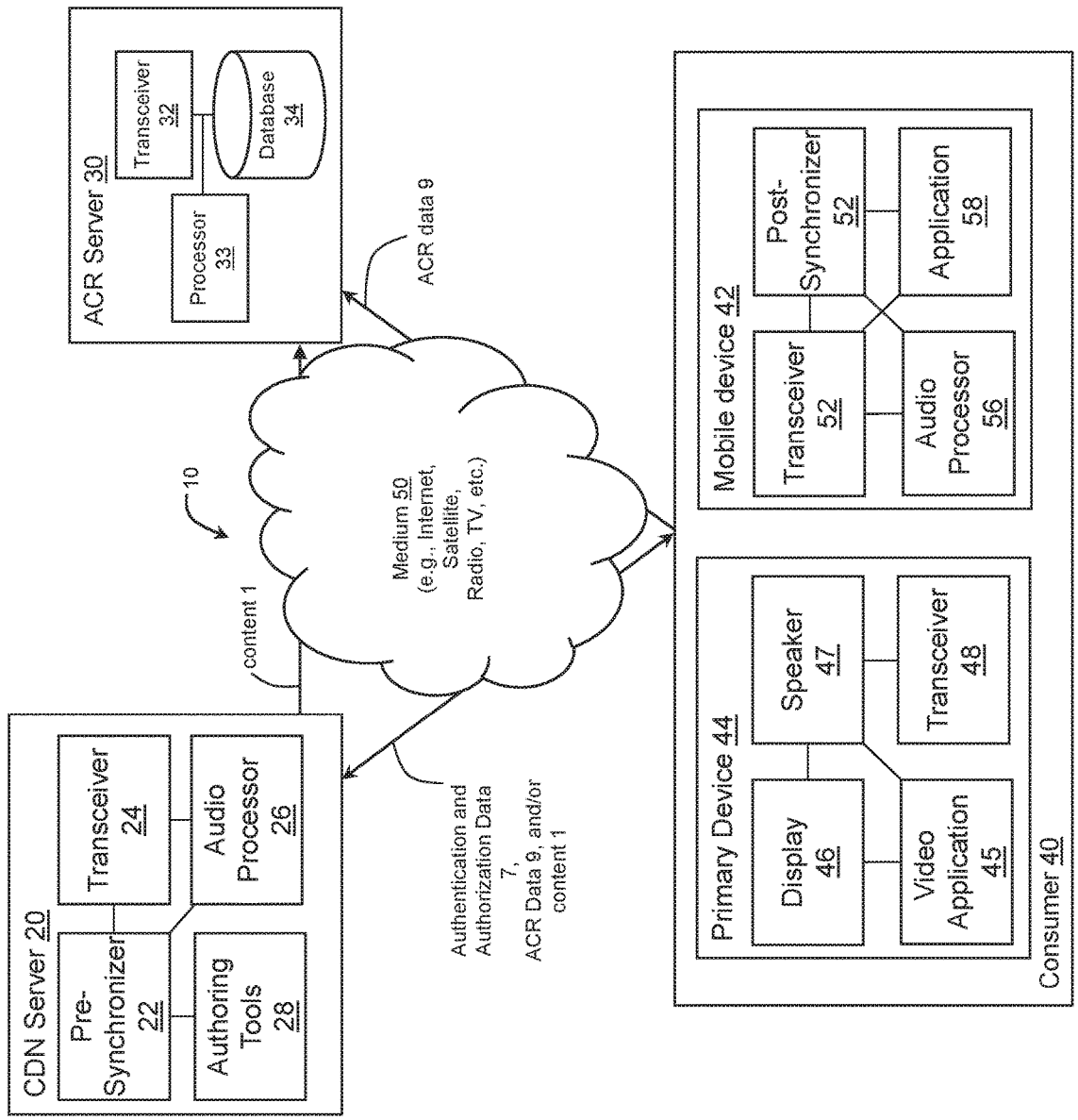
FIG. 3 illustrates a block diagram of an exemplary system for continuous dual authentication.

FIG. 3 illustrates a block diagram of an exemplary system for continuous dual authentication including details at the CDN server 20, the ACR server 30, and the consumer 40. The CDN server 20 includes a machine or group of machines for streaming content 1 to the consumer 40 and the ACR server 30 for content fingerprinting. The content may include audio. In the illustrated embodiment, the CDN server 20 includes a pre-synchronizer 22 that pegs ACR data 9 to instants of the reference representation 11 (e.g., the representation of the audio portion 5 or the representation of the visual portion 3 of the audiovisual content 1 of FIG. 1).

The CDN server 20 may also include a transceiver 24 that communicates the audiovisual content 1 to the consumer 30 and the reference representation 11 and the ACR data 9 pegged to the instants in the reference representation 11 to the ACR server 30 via the medium 50. The ACR server 30 is accessible by the consumer 40. Alignment of the reference representation 11 to the content's audio 5 (or the content's video 3 in the case where the reference representation 11 corresponds to the visual portion 3) upon subsequent playout, broadcast, distribution, performance, etc. of the audiovisual content 1 synchronizes the ACR data 9 pegged to the instants in reference representation 11 to the audiovisual content 1.

The CDN server 20 may also include an audio processor 26, which may process the audio portion 5 of the audiovisual content 1 to create a reference representation 11 of the content's audio 5 such as, for example, the audio waveform signature of FIG. 2. In an alternative embodiment, the CDN server 20 may also include a video processor, which may process the visual portion 3 of the audiovisual content 1 to create a representation of the content's video 3 instead of or in addition to the audio waveform signature of FIG. 2. The transceiver 24 may then communicate the reference representation 11 (e.g., the signature) and the ACR data 9 pegged to the instants in the reference representation 11 to the ACR server 30.

In one embodiment, the pre-synchronizer 22 creates a link to the ACR server 30. The link may be a Uniform Resource Identifier (e.g., URL) or similar location identifier or locator. The audio processor 26 may insert the link to the storage location 40 into metadata of the audiovisual content 1 or specifically metadata of the content's audio 5 or content video 3. The audio portion 5 may be encoded as but not limited to Dolby AC-4, AC-3 or E-AC-3, MPEG-H, or ATSC 3.0, all of which can carry metadata. The consumer 40 may extract the link to the ACR server 30 from the metadata of the audiovisual content 1 or of the content's audio 5 or video 3. Having the link to the ACR server 30, the consumer 40 may then communicate to the ACR server 30 to obtain the information stored in the ACR server 30 such as content fingerprints or to store information therein for further processing.

In one embodiment, the audio processor 26 analyzes the content's audio 5 to collect statistics of the audio portion 5 including, for example, loudness or dynamic range scaling of the audio portion 5. The audio processor 26 may insert the statistics of the content's audio 5 into metadata of the audiovisual content 1, of the content's audio 5, or of the content's video 3. The consumer 40 may extract the statistics of the content's audio 5 from the metadata.

In one embodiment, the transceiver 24 communicates the statistics of the content's audio 5 to the ACR server 30 in the ACR data 9. The mobile device 42 may obtain the statistics of the content's audio 5 from the ACR server 30 for use in continuous dual authentication of the permission of the consumer to receive content 1.

The CDN server 20 may also include authoring tools 28 to provide content providers access to consumer analytic data collected using content fingerprints generated by the mobile device 42. The authoring tools 28 may allow, for example, a content provider to enter to present different options to a user via user interface based on the percentage of content viewed. The authoring tools 28 may be used to present a Uniform Resource Locator (URL) to a resource to a user that includes rating options, review options, customer reward/loyalty options, etc. For example, the Academy of Motion Picture Arts and Sciences may want to ensure that members that cast a vote for the "Best Picture" category have watched a predetermined percentage of a movie. The mobile device 42 and/or the ACR server 30 may track the percentage of a movie viewed by a consumer 40 based on the content fingerprints received. In another example, the "Cinematography" category may require a member to view less than the "Best Picture" category and the mobile device 42 and/or ACR server 30 may be configured to allow a member to vote after a predetermined percentage of the movie has been viewed based on the content fingerprints received.

The ACR server 30 may include a machine or group of machines for processing audio/visual content to identify one or more content fingerprints. The ACR server may include a transceiver 32 that communicates (i.e., transmits and receives) the content 1 and the ACR data 9. The ACR server 30 may also include a database 34 that stores the reference representation 11 and the ACR data 9 pegged to instants in the reference representation 11.

In one embodiment, the transceiver 32 communicates and the database 34 stores statistics of the content's audio 5 (e.g., loudness or dynamic range scaling) as ACR data 9. In one embodiment, the transceiver 32 continues to communicate and the database 34 continues to store ACR data 9 during subsequent playout, broadcast, distribution or performance of the audiovisual content 1 as described above. The ACR server 30 may be a location accessible to the CDN server 20 and the consumer 40, such as the cloud or a local archive with general accessibility (e.g., via a link as described above) that may be controlled by subscription, password, etc.

The consumer 40 may include a machine or group of machines for synchronizing ACR data 9 to content 1 including audio 5 and video 3. In the illustrated embodiment, the consumer 40 includes a mobile device 42 and a primary device 44. The primary device 44 may receive content 1 from the CDN server 20 and use a video player application 45 to transmit the video 3 portion of content 1 to display 46 and the audio portion 5 of content 1 to the speaker 47. The transceiver 48 may be used to transmit and receive content 1 and/or Authentication and Authorization data 7 with the CDN server 20 and/or the mobile device 42.

The mobile device 42 includes a transceiver 52 that transmits and receives the authentication and authorization data 7 and the content 1 with the CDN server 20 and/or the primary device 44 and the ACR data 9 with the ACR server 30.

The mobile device 42 may also include a post-synchronizer 54 that determines a content fingerprint based on the audio 5 or video 3 of content 1 thereby continuously authenticating that the mobile device 42 of an authorized user is associated with the playback of content 1. The specific methodology by which the post-synchronizer 34 determines the content fingerprint based on the audio 5 or the video 3 is not crucial to the present invention. Mechanisms by which such content fingerprinting may be accomplished include variations of Automatic Content Recognition (ACR). ACR may be used to identify or recognize content played on a media device such as primary device 44 or present in a media file if content 1 is played back on the mobile device 42. Acoustic fingerprinting generates unique fingerprints from the content itself. Fingerprinting techniques work regardless of content format, codec, bitrate and compression techniques. This makes it possible to use across networks and channels. Continuously verifying an ongoing, real-time fingerprint of the audiovisual content 1 from a device associated with an authorized consumer may be used to for dual authentication along with a user credential. An example of such fingerprinting techniques may be found in U.S. Pat. No. 9,786,298 with an issue date of Oct. 10, 2017, which is incorporated here by reference in its entirety.

The mobile device 42 may also include an audio processor 56 that receives the content's audio 5 from the transceiver 52 or the speaker 47 of the primary device 44. In one embodiment, the audio processor 56 may extract metadata from the audiovisual content 1 or from the content's audio 5 and, from the metadata, the audio processor may extract the link to the ACR server 30 as described above. Having the link to the ACR server 30, the transceiver 52 may then communicate to the ACR server 30 to obtain the information stored in the ACR server 30 or to store information therein.

In one embodiment, the audio processor 56 extracts statistics of the content's audio 5 (e.g., loudness or dynamic range scaling) stored in the metadata as described above instead of or in addition to extracting a link to the ACR server 30. In one embodiment, the transceiver 52 receives the ACR data 9 from the ACR server 30. Having the statistics of the content's audio 5, the audio processor 56 may then authorize audio to be played at or distributed from the consumer 40 based on the specific authorization assigned to the consumer by the CDN server.

In another embodiment, the mobile device may be positioned to capture the content's video 3 from display 46 of the primary device 44. The captured video may be processed in the mobile device 42 and compared to ACR data 9 obtained from the ACR server 30. Based on that comparison, the audiovisual content 1 may be identified. That is, if the content's video 3 and the ACR data 9 match within a set of parameters, the audiovisual content 1 may be identified as corresponding to the ACR data 9 and the mobile device 42 may transmit an authorization to the CDN server 20 to continue streaming content 1. Similarly, if the content's video 3 and the ACR data 9 do not match within a set of parameters, the audiovisual content 1 may be said to not correspond to the ACR data 9 and the mobile device 42 may transmit an instruction to the CDN server 20 to stop streaming content 1. Also, if no authorization is received by the CDN server 20, i.e., the mobile device 42 has not matched content 1 and ACR data 9 after a predetermined interval has expired, the CDN server 20 may stop streaming content 1.

The mobile device 42 may also include application 58 that presents (e.g., display) a login form to a consumer to access audiovisual content 1. The login form may require a user to enter a user credential. The application 58 may prompt the user for a biometric token such as tokens generated by a fingerprint reader or structured light sensor. The application 58 may use the user credential and/or the biometric token to authenticate the user and transmit an access token along with a device identifier to the CDN server for access to content 1. The CDN server may verify the consumer is authorized to view content 1 and begin streaming content 1 to the primary device 44 and/or the mobile device 42. The application 58 may be configured to collect ACR data 9 to continuously authenticate the consumer 40 and transmit the ACR data 9 so that the stream is not interrupted.

In one embodiment, the application 58 may be used with consumer analytic data. The application 58 may, using the percentage of content viewed based content fingerprints, present one or more options to a consumer.

The application 58 may be configured to access additional data available in a portable electronic device such as accelerometer data and Global Navigation Satellite System (GNSS) data. A content provider may wish to restrict access to content to a specific user and a specific geolocation. At login, the application 58 may determine a geolocation of the mobile device 42 of the consumer using GNSS data and transmit the geolocation in the authentication and authorization data 7. The CDN server 20 may determine the mobile device 42 is at an authorized location based on the geolocation and begin streaming content. The application 58 may continue to collect GNSS data and accelerometer data to determine if the mobile device 42 remains in the authorized location or within a threshold distance during content playback. The mobile device 42 and/or the CDN server may stop content playback if the mobile device 42 moves from the authorized location.

Similar rules can be used on their own or in conjunction with—such as "time" of when a stream can be viewed, etc. The application 58 may be configured to access additional data such as world clock data. A content provider may wish to restrict access to content to a specific user and a time range. The application 58 may determine a current time from the world clock data and transmit it in the authentication and authorization data 7. The CDN server 20 may receive the current time data from the application 58 or the CDN server 20 may obtain it itself, and determine the current time is within an authorized time range and begin streaming content. The application 58 and/or the CDN server 20 may continue to collect time data to determine if the current time remains in the authorized time range during content playback. The mobile device 42 and/or the CDN server may stop content playback if the current time moves from the authorized time range.

The system 10 may be implemented using software, hardware, analog or digital techniques.

Exemplary methods may be better appreciated with reference to the flow diagrams of FIGS. 4, 5, 6, and 7. While for purposes of simplicity of explanation, the illustrated methodologies are shown and described as a series of blocks, it is to be appreciated that the methodologies are not limited by the order of the blocks, as some blocks can occur in different orders or concurrently with other blocks from that shown and described. Moreover, less than all the illustrated blocks may be required to implement an exemplary methodology. Furthermore, additional methodologies, alternative methodologies, or both can employ additional blocks, not illustrated.

In the flow diagrams, blocks denote "processing blocks" that may be implemented with logic. The processing blocks may represent a method step or an apparatus element for performing the method step. The flow diagrams do not depict syntax for any particular programming language, methodology, or style (e.g., procedural, object-oriented). Rather, the flow diagrams illustrate functional information one skilled in the art may employ to develop logic to perform the illustrated processing. It will be appreciated that in some examples, program elements like temporary variables, routine loops, and so on, are not shown. It will be further appreciated that electronic and software applications may involve dynamic and flexible processes so that the illustrated blocks can be performed in other sequences that are different from those shown or that blocks may be combined or separated into multiple components. It will be appreciated that the processes may be implemented using various programming approaches like machine language, procedural, object oriented or artificial intelligence techniques.

While the figures illustrate various actions occurring in serial, it is to be appreciated that various actions illustrated could occur substantially in parallel, and while actions may be shown occurring in parallel, it is to be appreciated that these actions could occur substantially in series. While a number of processes are described in relation to the illustrated methods, it is to be appreciated that a greater or lesser number of processes could be employed, and that lightweight processes, regular processes, threads, and other approaches could be employed. It is to be appreciated that other exemplary methods may, in some cases, also include actions that occur substantially in parallel. The illustrated exemplary methods and other embodiments may operate in real-time, faster than real-time in a software or hardware or hybrid software/hardware implementation, or slower than real time in a software or hardware or hybrid software/hardware implementation.

Figure 4:
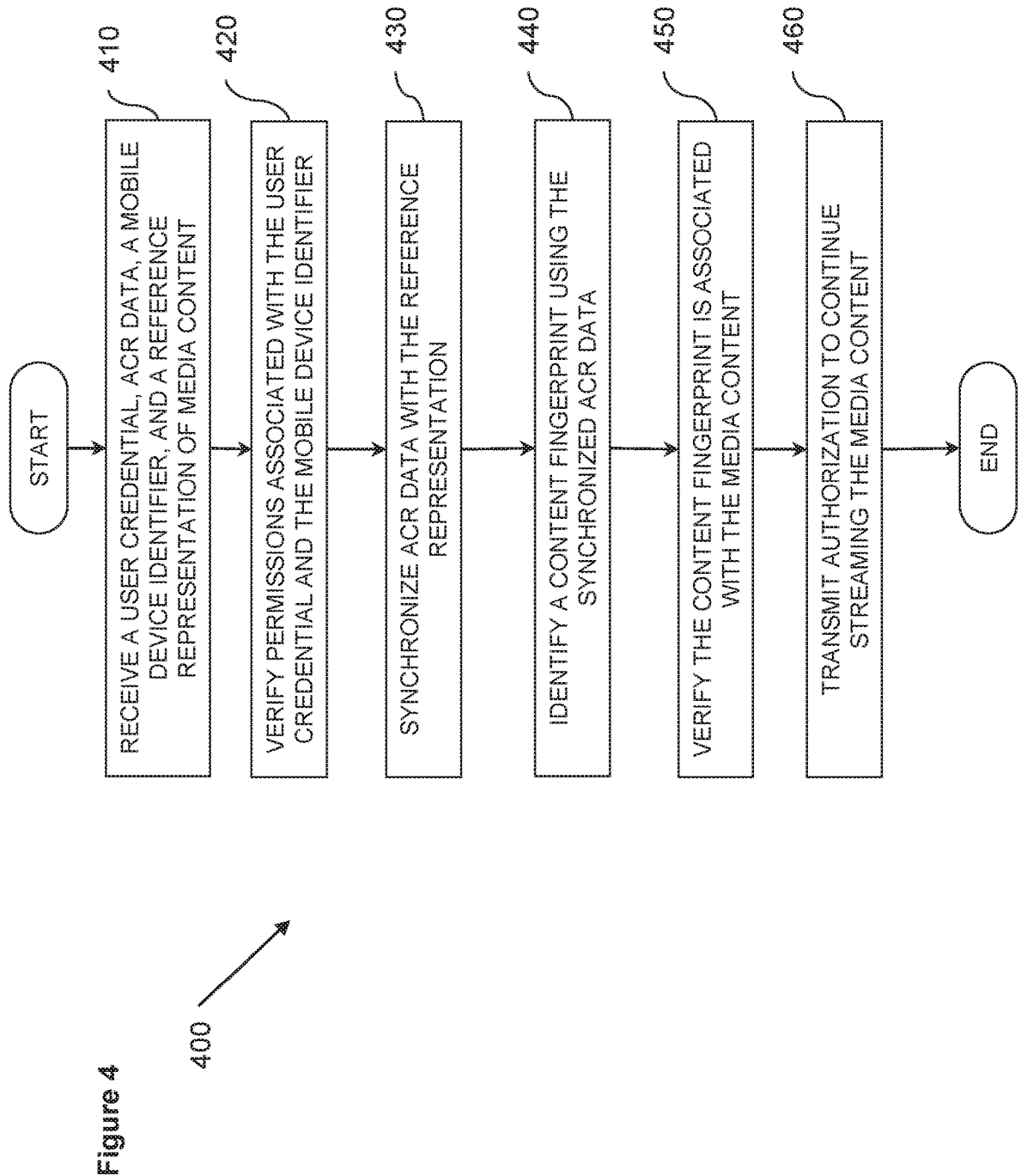
FIG. 4 illustrates a flow diagram for an exemplary method for continuous dual authentication to access media content.

FIG. 4 illustrates a flow diagram for an exemplary method 400 for continuous dual authentication to access media content.

The method 400 includes at 410 receiving a user credential, ACR data, a mobile device identifier, and a reference representation of media content. Receiving the user credential may take place prior to or during streaming, broadcast, or distribution of media content as described above. Receiving the ACR data may take place during streaming, broadcast, or distribution of media content as described above. The ACR data depends on data associated with the media content such as audio, video, metadata, etc. The method includes receiving a mobile device identifier associated with the ACR data. The mobile device identifier may be used to identify a device associated with a consumer authorized to access media content used to generate the ACR data. Finally, the reference representation may include audio and/or video portions of the media content used for identifying content fingerprints.

At 420, the method verifies permissions associated with the user credential and the mobile device identifier. Verifying permissions may include accessing one or more databases to determine both the user credential and the mobile device identifier are associated with a consumer authorized to access the media content. Verifying the mobile device identifier is associated with a single consumer authorized to access the media content facilitates continuous dual authentication using ACR data collected by one or more sensors of the mobile device.

At 430, the method synchronizes the ACR data with the reference representation. The ACR data may include fingerprints based on audio or video of streamed media content. The reference representation may include pre-generated fingerprints, or a full record of fingerprints for the entire duration of the media content. Synchronizing the ACR data and the reference representation may include matching a fingerprint from the ACR data with a fingerprint from the reference representation.

At 440, the method identifies a content fingerprint using the synchronized ACR data to determine a position in the media content.

At 450, the method verifies the content fingerprint is associated with the media content the consumer is authorized to access.

At 460, the method transmits an authorization to continue streaming media content associated with the user credential and the content fingerprint that the consumer is authorized to access.

This process may be continually repeated until viewing of the media content is completed.

Figure 5:
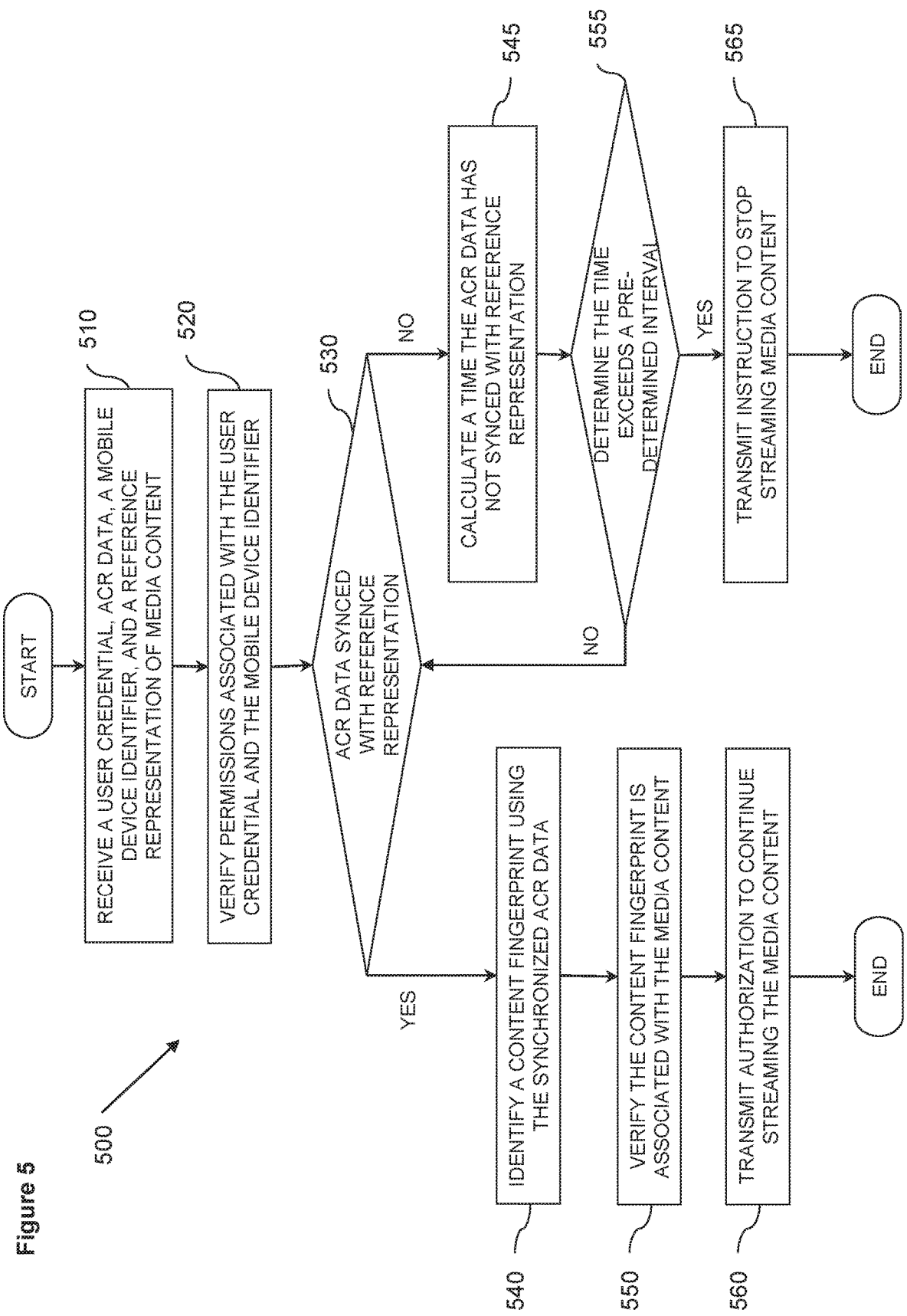
FIG. 5 illustrates a flow diagram for an exemplary method for continuous dual authentication to access media content.

FIG. 5 illustrates a flow diagram for an exemplary method for continuous dual authentication to access media content.

The method 500 includes, at 510 and 520 the same steps as method 400 at 410 and 420 as described above. At 530, the method detects whether the ACR data has synced with the reference representation. If the ACR data has synced with the reference representation, steps 540, 550, and 560 remain the same as steps 440, 450, and 460 respectively described above.

At 545, if the ACR data has not synced with the reference representation, the method calculates a length of time that the ACR data has not synced with the reference representation. At 555, the method may determine the length of time exceeds a predetermined interval used to control access to the media content. The predetermined interval may be based on the consumer, the location, the time zone, etc. If the length of time does not exceed the predetermined interval, the method continues to attempt to sync the ACR data with the reference representation. At 565, if the length of time exceeds the predetermined interval the method transmit an instruction to stop streaming the media content.

Figure 6:
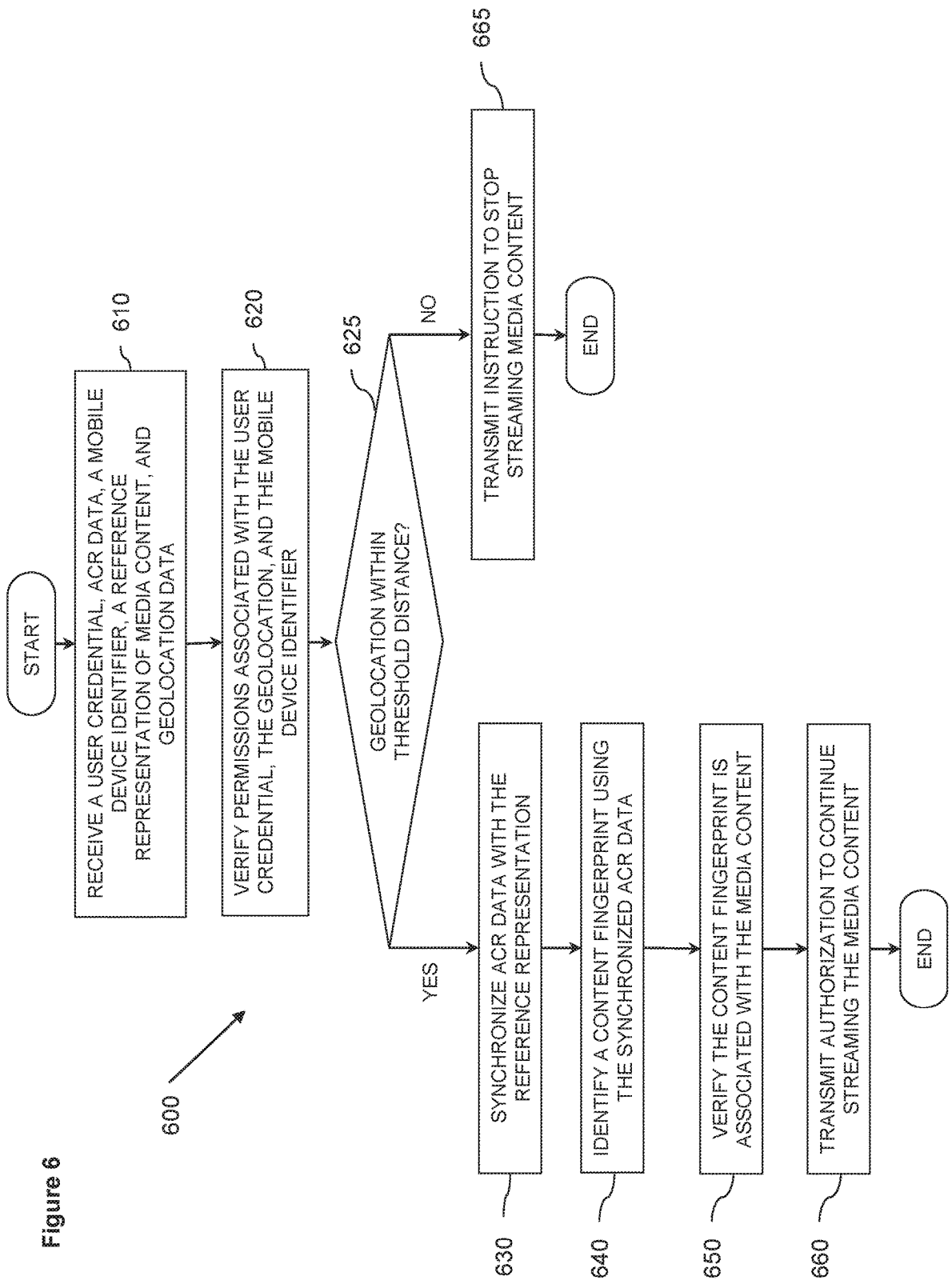
FIG. 6 illustrates a flow diagram for an exemplary method for providing continuous dual authentication using geolocation data and content fingerprints.

FIG. 6 illustrates a flow diagram for an exemplary method for continuous dual authentication to access media content.

At 610, the method 600 includes receiving a user credential, ACR data, a mobile device identifier, a reference representation of media content, and geolocation data. The geolocation data may be received from a mobile device based on GNSS signals and/or other location assist technologies. At 620, the permissions associated with the user credential, the mobile device identifier, and the geolocation are verified to provide access to media content. At step 625 a current geolocation is compared to the authorized geolocation to determine a distance that is compared to a threshold distance. If the current geolocation is within the threshold distance, the method 600 includes steps 630, 640, 650, and 660 that are the same as steps 430, 440, 450, and 460 described above. If the current geolocation exceeds the threshold distance, at 665, the method transmits an instruction to stop streaming the media content.

Figure 7:
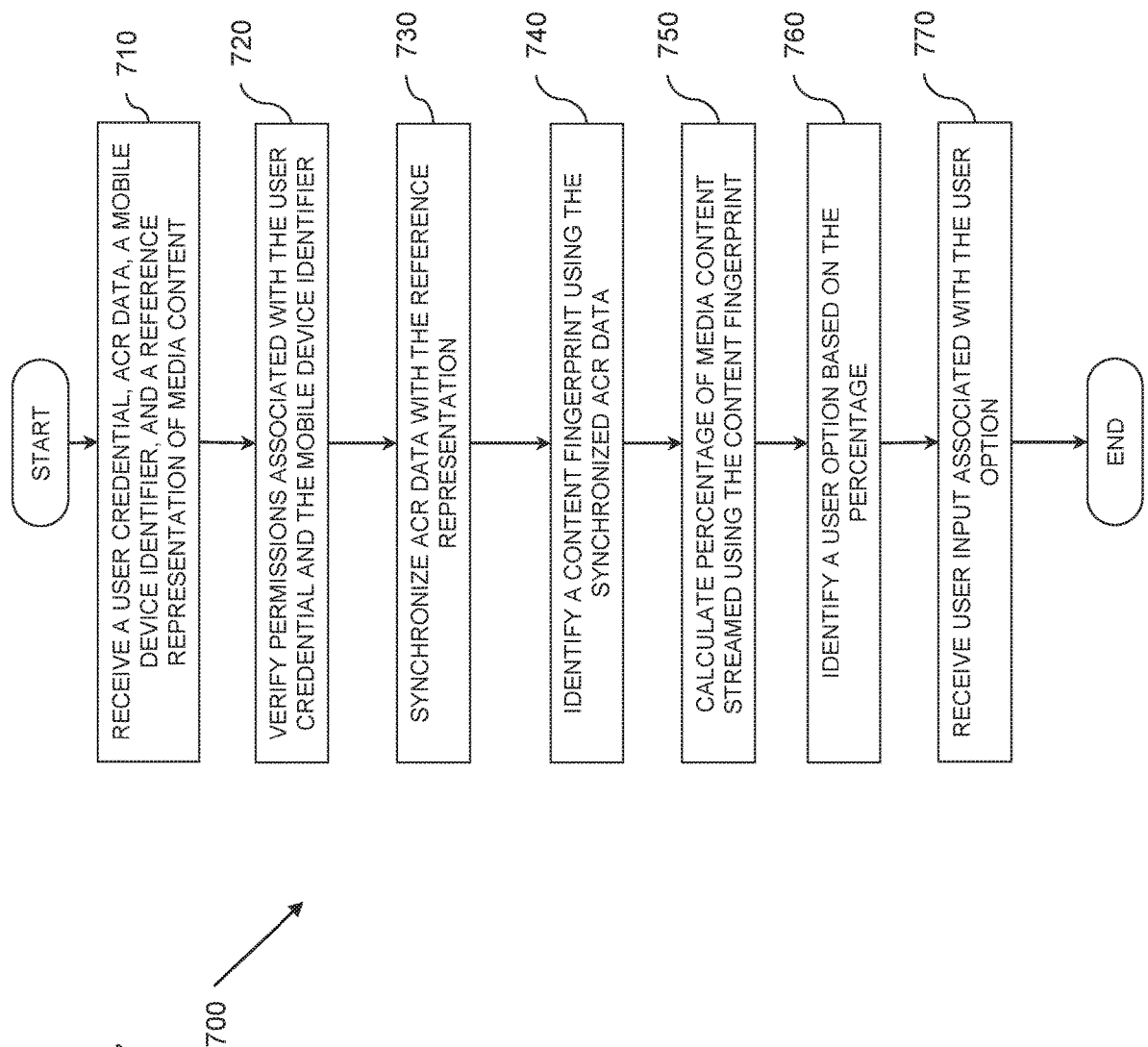
FIG. 7 illustrates a flow diagram for an exemplary method for providing data analytics options based on content fingerprints.

FIG. 7 illustrates a flow diagram for an exemplary method for providing data analytics options based on content fingerprints.

The method 700 includes, at 710, 720, 730, and 740 the same steps as method 400 at 410, 420, 430, and 440 as described above. At 750, the method 700 may use the content fingerprint to identify a time position in the content. The method 700 may use the time position to calculate a percentage of the media content streamed based on the time position. At 760, the method 700 may identify one or more user options based on the percentage of the media content streamed such as a review category or to ensure that key spans of the content were viewed by taking advantage of the time-based position ability of the ACR. At 770, the method may receive the user input and create a data object to store and/or transmit the user input for further processing.

Figure 8:
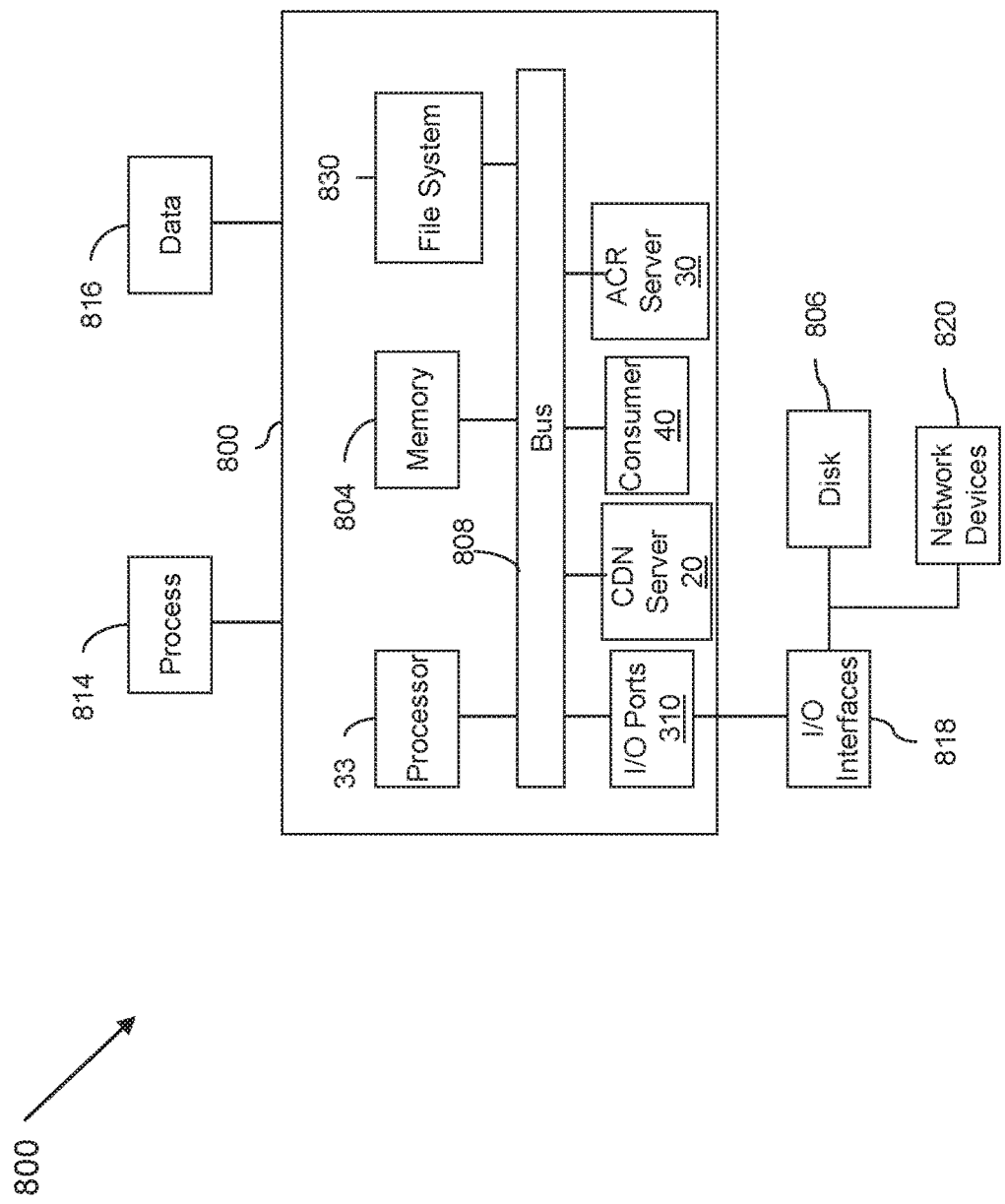
FIG. 8 illustrates a block diagram of an exemplary machine for continuous dual authentication using content fingerprints.

FIG. 8 illustrates a block diagram of an exemplary machine 800 for curating and/or presenting ancillary data to be presented to audience members of a visual program content. The machine 800 includes a processor 43, a memory 804, and I/O Ports 810 operably connected by a bus 808.

In one example, the machine 800 may receive input signals including the audiovisual content 1, the visual portion 3, the audio portion 5, the ancillary data 7, the representation 9, etc. via, for example, I/O Ports 810 or I/O Interfaces 818. The machine 800 may also include the transceiver 32, the processor 33, and the database 34 of the ACR server 30. Thus, the CDN server 20, the mobile device 42, the primary device 44, or the ACR server 30 may be implemented in machine 800 as hardware, firmware, software, or a combination thereof and, thus, the machine 800 and its components may provide means for performing functions described and/or claimed herein as performed by the transceiver 32, the processor 33, and the database 34.

The processor 33 can be a variety of various processors including dual microprocessor and other multi-processor architectures. The memory 804 can include volatile memory or non-volatile memory. The non-volatile memory can include, but is not limited to, ROM, PROM, EPROM, EEPROM, and the like. Volatile memory can include, for example, RAM, synchronous RAM (SRAM), dynamic RAM (DRAM), synchronous DRAM (SDRAM), double data rate SDRAM (DDR SDRAM), and direct RAM bus RAM (DRRAM).

A disk 806 may be operably connected to the machine 800 via, for example, an I/O Interfaces (e.g., card, device) 818 and an I/O Ports 810. The disk 806 can include, but is not limited to, devices like a magnetic disk drive, a solid-state disk drive, a floppy disk drive, a tape drive, a Zip drive, a flash memory card, or a memory stick. Furthermore, the disk 806 can include optical drives like a CD-ROM, a CD recordable drive (CD-R drive), a CD rewriteable drive (CD-RW drive), or a digital video ROM drive (DVD ROM). The memory 804 can store processes 814 or data 816, for example. The disk 806 or memory 804 can store an operating system that controls and allocates resources of the machine 800.

The bus 808 can be a single internal bus interconnect architecture or other bus or mesh architectures. While a single bus is illustrated, it is to be appreciated that machine 800 may communicate with various devices, logics, and peripherals using other busses that are not illustrated (e.g., PCIE, SATA, Infiniband, 1394, USB, Ethernet). The bus 808 can be of a variety of types including, but not limited to, a memory bus or memory controller, a peripheral bus or external bus, a crossbar switch, or a local bus. The local bus can be of varieties including, but not limited to, an industrial standard architecture (ISA) bus, a microchannel architecture (MCA) bus, an extended ISA (EISA) bus, a peripheral component interconnect (PCI) bus, a universal serial (USB) bus, and a small computer systems interface (SCSI) bus.

The machine 800 may interact with input/output devices via I/O Interfaces 818 and I/O Ports 810. Input/output devices can include, but are not limited to, a keyboard, a microphone, a pointing and selection device, cameras, video cards, displays, disk 806, network devices 820, and the like. The I/O Ports 810 can include but are not limited to, serial ports, parallel ports, and USB ports.

The machine 800 can operate in a network environment and thus may be connected to network devices 820 via the I/O Interfaces 818, or the I/O Ports 810. Through the network devices 820, the machine 800 may interact with a network. Through the network, the machine 800 may be logically connected to remote computers. The networks with which the machine 800 may interact include, but are not limited to, a local area network (LAN), a wide area network (WAN), and other networks. The network devices 820 can connect to LAN technologies including, but not limited to, fiber distributed data interface (FDDI), copper distributed data interface (CDDI), Ethernet (IEEE 802.3), token ring (IEEE 802.5), wireless computer communication (IEEE 802.11), Bluetooth (IEEE 802.15.1), Zigbee (IEEE 802.15.4) and the like. Similarly, the network devices 820 can connect to WAN technologies including, but not limited to, point to point links, circuit switching networks like integrated services digital networks (ISDN), packet switching networks, and digital subscriber lines (DSL). While individual network types are described, it is to be appreciated that communications via, over, or through a network may include combinations and mixtures of communications.

Definitions

The following includes definitions of selected terms employed herein. The definitions include various examples or forms of components that fall within the scope of a term and that may be used for implementation. The examples are not intended to be limiting. Both singular and plural forms of terms may be within the definitions.

"Content" corresponds to still images, segments of audio media, video media, or audio/visual (AV) media and include information that is embodied, stored, transmitted, received, processed, or otherwise used with at least one medium.

Common media content formats include FLV format (flash video), Windows Media Video, RealMedia, MFX, Quicktime, MPEG, MP3, DivX, JPEGs, and Bitmaps. As used herein, the terms "media clips", "media content," "information content," and "content" may be used interchangeably.

"Data store" or "database," as used herein, refers to a physical or logical entity that can store data. A data store may be, for example, a database, a table, a file, a list, a queue, a heap, a memory, a register, and so on. A data store may reside in one logical or physical entity or may be distributed between two or more logical or physical entities.

"Logic," as used herein, includes but is not limited to hardware, firmware, software or combinations of each to perform a function(s) or an action(s), or to cause a function or action from another logic, method, or system. For example, based on a desired application or needs, logic may include a software-controlled microprocessor, discrete logic like an application specific integrated circuit (ASIC), a programmed logic device, a memory device containing instructions, or the like. Logic may include one or more gates, combinations of gates, or other circuit components. Logic may also be fully embodied as software. Where multiple logical logics are described, it may be possible to incorporate the multiple logical logics into one physical logic. Similarly, where a single logical logic is described, it may be possible to distribute that single logical logic between multiple physical logics.

An "operable connection," or a connection by which entities are "operably connected," is one in which signals, physical communications, or logical communications may be sent or received. Typically, an operable connection includes a physical interface, an electrical interface, or a data interface, but it is to be noted that an operable connection may include differing combinations of these or other types of connections sufficient to allow operable control. For example, two entities can be operably connected by being able to communicate signals to each other directly or through one or more intermediate entities like a processor, operating system, a logic, software, or other entity. Logical or physical communication channels can be used to create an operable connection.

In broadcasting, "playout" is a term for the transmission of radio or TV channels from the broadcaster into broadcast networks that delivers the content to the audience.

"Signal," as used herein, includes but is not limited to one or more electrical or optical signals, analog or digital signals, data, one or more computer or processor instructions, messages, a bit or bit stream, or other means that can be received, transmitted, or detected.

"Software," as used herein, includes but is not limited to, one or more computer or processor instructions that can be read, interpreted, compiled, or executed and that cause a computer, processor, or other electronic device to perform functions, actions or behave in a desired manner. The instructions may be embodied in various forms like routines, algorithms, modules, methods, threads, or programs including separate applications or code from dynamically or statically linked libraries. Software may also be implemented in a variety of executable or loadable forms including, but not limited to, a stand-alone program, a function call (local or remote), a servlet, an applet, instructions stored in a memory, part of an operating system or other types of executable instructions. It will be appreciated by one of ordinary skill in the art that the form of software may depend, for example, on requirements of a desired application, the environment in which it runs, or the desires of a designer/programmer or the like. It will also be appreciated that computer-readable or executable instructions can be located in one logic or distributed between two or more communicating, co-operating, or parallel processing logics and thus can be loaded or executed in serial, parallel, massively parallel and other manners.

Suitable software for implementing the various components of the example systems and methods described herein may be produced using programming languages and tools like Java, Pascal, C#, C++, C, CGI, Perl, SQL, APIs, SDKs, assembly, firmware, microcode, or other languages and tools. Software, whether an entire system or a component of a system, may be embodied as an article of manufacture and maintained or provided as part of a computer-readable medium as defined previously. Another form of the software may include signals that transmit program code of the software to a recipient over a network or other communication medium. Thus, in one example, a computer-readable medium has a form of signals that represent the software/firmware as it is downloaded from a web server to a user. In another example, the computer-readable medium has a form of the software/firmware as it is maintained on the web server. Other forms may also be used.

"User" or "consumer," as used herein, includes but is not limited to one or more persons, software, computers or other devices, or combinations of these.

Some portions of the detailed descriptions that follow are presented in terms of algorithms and symbolic representations of operations on data bits within a memory. These algorithmic descriptions and representations are the means used by those skilled in the art to convey the substance of their work to others. An algorithm is here, and generally, conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic and the like.

It has proven convenient at times, principally for reasons of common usage, to refer to these signals as bits, values, elements, symbols, characters, terms, numbers, or the like. It should be borne in mind, however, that these and similar terms are to be associated with the appropriate physical quantities and are merely convenient labels applied to these quantities. Unless specifically stated otherwise, it is appreciated that throughout the description, terms like processing, computing, calculating, determining, displaying, or the like, refer to actions and processes of a computer system, logic, processor, or similar electronic device that manipulates and transforms data represented as physical (electronic) quantities.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

While example systems, methods, and so on, have been illustrated by describing examples, and while the examples have been described in considerable detail, it is not the intention of the applicants to restrict or in any way limit scope to such detail. It is, of course, not possible to describe every conceivable combination of components or methodologies for purposes of describing the systems, methods, and so on, described herein. Additional advantages and modifications will readily appear to those skilled in the art. Therefore, the invention is not limited to the specific details, the representative apparatus, and illustrative examples shown and described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

What is claimed is:

1. A machine or group of machines for dual authentication, comprising:
a first device including:
a processor configured to receive:
a user credential;
automatic content recognition (ACR) data based on an audiovisual property of a media content stream, wherein the ACR data is associated with a device identifier; and
a reference representation associated with media content;
the processor configured to:
verify the user credential and the device identifier are associated with a consumer authorized to access the media content;
synchronize the ACR data with the reference representation;
identify a content fingerprint associated with the synchronized ACR data;
verify the content fingerprint is associated with the media content the consumer is authorized to access; and
thereafter, transmit an authorization to continue streaming the media content associated with the user credential and the content fingerprint in a second device different from the first device.

2. The machine or group of machines of claim 1, wherein the processor is further configured to:
identify a time position in the content based on the content fingerprint;
calculate a percentage of the media content streamed based on the time position; and
transmit the percentage of the media content streamed.

3. The machine or group of machines of claim 2, wherein the processor is further configured to:
identify a user option associated with the percentage of the media content streamed; and
transmit the user option to a user device.

4. The machine or group of machines of claim 3, wherein the processor is further configured to:
receive a user input based on the user option; and
create a data object to store the user input.

5. The machine or group of machines of claim 1, wherein the processor is further configured to receive:
a geolocation and timestamp (world clock) associated with a user device; and
an authorized geolocation associated with a user;
wherein the processor is further configured to:
determine the geolocation associated with the user device is within a threshold distance of the authorized geolocation; and
transmit the authorization to stream the media content when the geolocation is within the threshold distance.

6. The machine or group of machines of claim 1, wherein the processor is further configured to:
detect the ACR data has not synchronized with the reference representation for a predetermined interval; and
transmit an instruction to stop the media content stream when the ACR data has not synchronized with the reference representation for the predetermined interval.

7. The machine or group of machines of claim 1, wherein the ACR data includes metadata extracted from the media content stream.

8. A method for continuous dual authentication to access media content comprising:
receiving a user credential from or at a first device;
receiving from or at the first device automatic content recognition (ACR) data based on an audiovisual property of a media content stream, wherein the ACR data is associated with a device identifier;
receiving a reference representation associated with media content;
verifying the user credential and the device identifier are associated with a consumer authorized to access the media content;
synchronizing the ACR data with the reference representation;
identifying a content fingerprint associated with the synchronized ACR data;
verifying the content fingerprint is associated with the media content the consumer is authorized to access; and
thereafter, transmitting an authorization to continue streaming the media content associated with the user credential and the content fingerprint in a second device different from the first device.

9. The method of claim 8 comprising:
identifying a time position in the content based on the content fingerprint;
calculating a percentage of the media content streamed based on the time position; and
transmitting the percentage of the media content streamed.

10. The method of claim 9 comprising:
identify a user option associated with the percentage of the media content streamed;
transmitting the user option to a user device;
receiving a user input based on the user option; and
creating a data object to store the user input.

11. The method of claim 8 comprising:
receiving data identifying a time range in which the consumer is authorized to access the media content;
receiving a current time signal;
determining whether the current time is within the time range; and
transmitting the authorization to stream the media content when the current time is within the time range.

12. The method of claim 8 comprising:
receiving a geolocation associated with a user device;
receiving an authorized geolocation associated with a user;
determining the geolocation associated with the user device is within a threshold distance of the authorized geolocation; and
transmitting the authorization to stream the media content when the geolocation is within the threshold distance.

13. The method of claim 8 comprising:
  detecting that the ACR data has not synchronized with the reference representation for a predetermined interval; and
  transmitting an instruction to stop the media content stream when the ACR data has not synchronized with the reference representation for the predetermined interval.

14. The method of claim 8 wherein the ACR data includes metadata extracted from the media content stream.

* * * * *